(12) United States Patent
Jiang et al.

(10) Patent No.: US 12,255,991 B2
(45) Date of Patent: Mar. 18, 2025

(54) PROVIDING SECURE DATA STORAGE AND MANAGEMENT

(71) Applicant: INTERNATIONAL BUSINESS MACHINES CORPORATION, Armonk, NY (US)

(72) Inventors: Peng Hui Jiang, Beijing (CN); Xi Qing Zhang, Beijing (CN); Ming Zhe Jiang, Beijing (CN); Mu Chen, Beijing (CN); Chun Ling Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 17/662,093

(22) Filed: May 5, 2022

(65) Prior Publication Data
US 2023/0361997 A1  Nov. 9, 2023

(51) Int. Cl.
*H04L 9/08* (2006.01)
*H04L 9/14* (2006.01)
*H04L 9/32* (2006.01)

(52) U.S. Cl.
CPC .............. *H04L 9/0861* (2013.01); *H04L 9/14* (2013.01); *H04L 9/3247* (2013.01)

(58) Field of Classification Search
CPC ............................ H04L 9/0861; H04L 9/3247
See application file for complete search history.

(56) References Cited

U.S. PATENT DOCUMENTS

| | | | |
|---|---|---|---|
| 10,193,690 B1 * | 1/2019 | Self | H04L 9/0894 |
| 10,615,969 B1 * | 4/2020 | Griffin | H04L 9/0877 |
| 11,070,535 B2 | 7/2021 | Basin | |
| 2013/0145177 A1 * | 6/2013 | Cordella | G06F 21/78 |
| | | | 713/193 |
| 2016/0182486 A1 | 6/2016 | Wu | |
| 2019/0340251 A1 * | 11/2019 | Peddada | H04L 9/16 |
| 2020/0092090 A1 * | 3/2020 | Lin | H04L 9/3242 |
| 2022/0155977 A1 * | 5/2022 | Taouil | G06F 12/1466 |

FOREIGN PATENT DOCUMENTS

CN  112711762 A  4/2021

OTHER PUBLICATIONS

Kute, et al., "Implementation of Secure File Storage on Cloud with Owner-Defined Attributes for Encryption", 2018 Fourth International Conference on Computing Communication Control and Automation (ICCUBEA), 2018, 6 pgs., doi: 10.1109/ICCUBEA.2018.8697792.

(Continued)

*Primary Examiner* — David J Pearson
(74) *Attorney, Agent, or Firm* — Scott S. Dobson

(57) ABSTRACT

Computer technology for combining an encryption/decryption (e/d) key with additional information to obtain a specialized e/d key. The additional information one or more of the following types of additional information: client UUID (universally unique identifier), FQDN (fully qualified domain name), database hardware information, data physical position on the hard disk and/or stored data creation date. By combining the basic key with these kind(s) of operational information and/or software/hardware identifier information, the security of the underlying encrypted data can be meaningfully enhanced.

16 Claims, 2 Drawing Sheets

(56) References Cited

OTHER PUBLICATIONS

Scott, et al., "A Location Based Encryption Technique and Some of Its Applications", Institute of Navigation National Technical Meeting 2003, Jan. 22-24, 2003, 8 pgs.

Udendhran, R., "A Hybrid Approach to Enhance Data Security in Cloud Storage", ICC '17, Mar. 22, 2017, Cambridge, United Kingdom, © 2017ACM, 6 pgs., DOI: 10.1145/3018896.3025138.

* cited by examiner

PROVIDING SECURE DATA STORAGE AND MANAGEMENT

BACKGROUND

The present invention relates generally to the fields of data storage security and management.

It is known that data can be protected from unauthorized access by encryption/decryption (e/d). As will be appreciated by those of skill in the art, encryption is performed using a set of key(s). Encryption renders the data impossible to use until it is decrypted, which is how encryption protects digital data against unauthorized access. Decryption is also performed using a set of key(s). Typically, the encryption key(s) and decryption key(s) are generated in a coordinated matter so that a given encryption key demands the use of a corresponding decryption key. In some applications, the encryption key may be identical to the decryption key. As used herein, the term "key" and/or "e/d key" refers to any key used for encryption, decryption or both. As a further nominative convention, while some encryption/decryption schemes may involve multiple separate keys to decrypt and/or encrypt, an e/d key shall be understood to be either a single key or a set of multiple separate keys (used in conjunction with each other) to perform decryption and/or encryption.

SUMMARY

According to an aspect of the present invention, there is a method, computer program product and/or system for use with a data storage system that includes stored data that performs the following operations (not necessarily in the following order): (i) receiving a common encryption/decryption (e/d) key; (ii) combining the common e/d key with additional information to obtain a specialized e/d key, with the additional information including at least one of the following types of additional information: a client signature and a server signature; and (iii) encrypting a first portion of the stored data with the specialized e/d key so that the specialized e/d key and the first portion of the stored data are a one-on-one match; wherein the server signature includes database hardware information.

According to an aspect of the present invention, there is a method, computer program product and/or system for use with a data storage system that includes stored data that performs the following operations (not necessarily in the following order): (i) receiving a common encryption/decryption (e/d) key; (ii) combining the common e/d key with additional information to obtain a specialized e/d key, with the additional information including at least one of the following types of additional information: a client signature and a server signature; and (iii)encrypting a first portion of the stored data with the specialized e/d key so that the specialized e/d key and the first portion of the stored data are a one-on-one match; wherein the server signature includes data physical position.

According to an aspect of the present invention, there is a method, computer program product and/or system for use with a data storage system that includes stored data that performs the following operations (not necessarily in the following order): (i) receiving a common encryption/decryption (e/d) key; (ii) combining the common e/d key with additional information to obtain a specialized e/d key, with the additional information including at least one of the following types of additional information: a client signature and a server signature; and (iii) encrypting a first portion of the stored data with the specialized e/d key so that the specialized e/d key and the first portion of the stored data are a one-on-one match; wherein the server signature includes data creation time.

DETAILED DESCRIPTION

Figure 1:
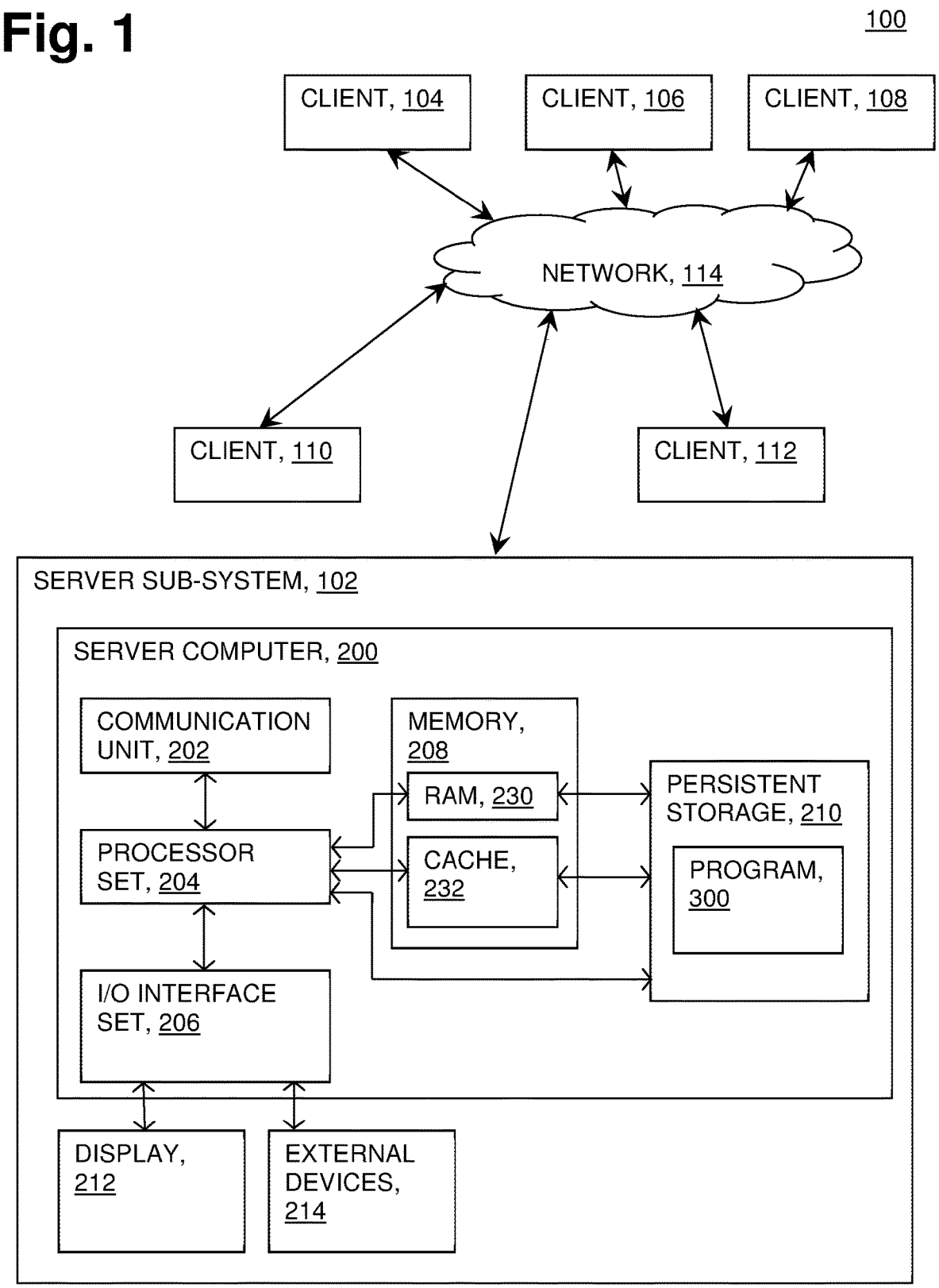
FIG. 1 is a block diagram of a first embodiment of a system according to the present invention.

Some embodiments of the present invention are directed to combining an encryption/decryption (e/d) key with additional information to obtain a specialized e/d key. The additional information one or more of the following types of additional information: client UUID (universally unique identifier), FQDN (fully qualified domain name), database hardware information, data physical position on the hard disk and/or stored data creation date. By combining the basic key with these kind(s) of operational information and/or software/hardware identifier information, the security of the underlying encrypted data can be meaningfully enhanced. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
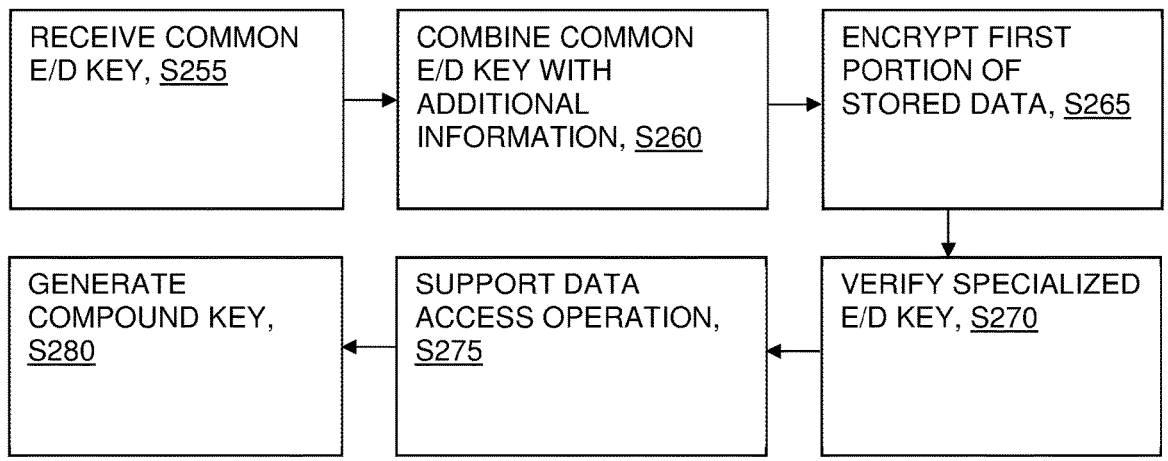
FIG. 2 is a flowchart showing a first embodiment method performed, at least in part, by the first embodiment system.
Figure 3:
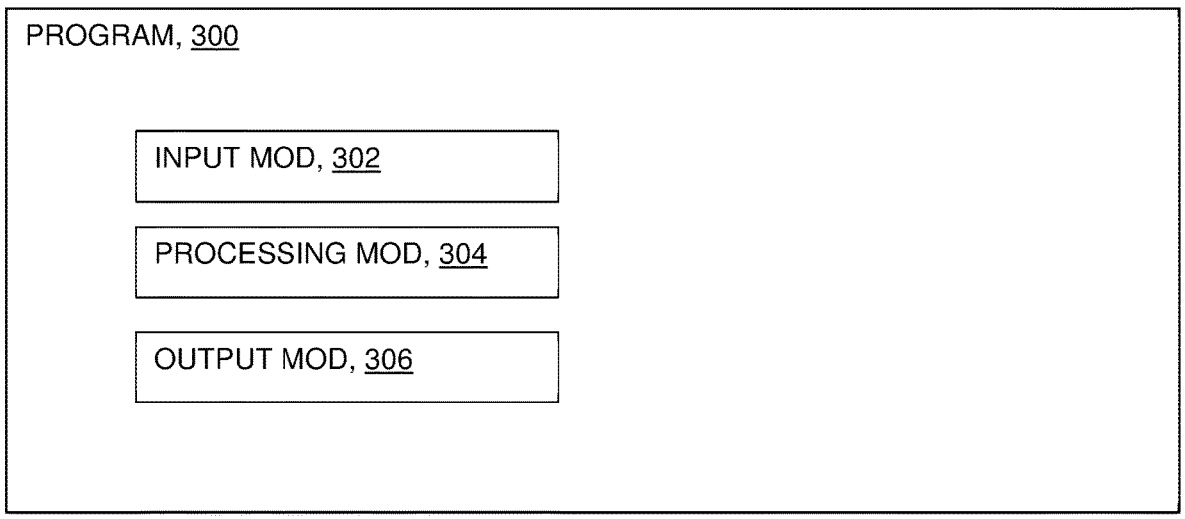
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3. The method is used with a data storage system that includes stored data. In this embodiment, server subsystem 102 is the data storage system and the stored data is stored in a database (not separately shown) in external device set 214 of server subsystem 102.

Processing begins at operation S255, where input module ("mod") 302 receives a common encryption/decryption (e/d) key. In accordance with the explanatory material in the Background section, above, the e/d key be used for encryption, decryption or both.

Processing proceeds to operation S260, where processing mod 304 combines the common e/d key with additional information to obtain a specialized e/d key, with the additional information including a client signature and a server signature. In this embodiment, the client signature includes a client UUID (universally unique identifier) and a FQDN (fully qualified domain name). In this embodiment, the server signature includes database hardware information, data physical position on the hard disk and stored data creation date.

Processing proceeds to operation S265, where processing mod 304 encrypts a first portion of the stored data with the specialized e/d key so that the specialized e/d key and the first portion of the stored data are a one-on-one match. In this embodiment, all of the stored data in the database in external device set 214 is encrypted with the specialized e/d key. Alternatively, a smaller portion may be encrypted, such as only data that is to be sent out through network 114.

Processing proceeds to operation S270, where processing mod 304 verifies the specialized e/d key with a real signature, location information and time information.

Processing proceeds to operation S275, where output mod 306 supports a data access operation involving the encrypted first portion of stored data by generating new e/d keys to support both an old location and a new location.

Processing proceeds to operation S280, where processing mod 304 generates a compound key which contains information about location and/or time information relating to the encrypted first portion of stored data so that if an unauthorized party has the common e/d key, the encrypted first portion of the stored data cannot be decrypted.

III. Further Comments and/or Embodiments

Some embodiments of the present invention recognize the following facts, potential problems and/or potential areas for improvement with respect to the current state of the art: (i) database management and security is becoming important in the cloud environment; (ii) in most cases, to keep data secure, people encrypt the data with a key stored as part of a database; (iii) only tenant(s) with a copy of the key can decrypt the data in the database; (iv) if an unauthorized individual obtains access to the encryption key, then any data encrypted with the applicable encryption definition becomes vulnerable; (v) when an encryption key is compromised in any way, it becomes helpful to generate a replacement key; (vi) if, due to a security breach, the owner has to decrypt all the data and then encrypt it again with the new replacement key then it will take effort and costly resources; and/or (vii) any backup databases are still subject to unauthorized access because they are still encrypted with the old encryption key.

One feature of some embodiments idea is the generation/use of a composite key to secure database storage without large data decryption and/or encryption efforts.

A method according to an embodiment of the present invention includes the following operations (not necessarily in the following order): (i) generating a compound key that only includes server signature (storage and timestamp) and with client signature saved in server side (the client signature includes at least one of but not limited to UUID and FQDN, etc. and the server signature includes at least one of but not limited to database hardware information, data physical position, data creation time, etc.); (ii) encrypt the data with the common key only—the client signature are saved in the server side but not in the combined key—only the server signature (storage and timestamp) are in the combined key; (iii) the compound key and the encrypted data are a one-on-one match; (iv) analyze and verify the encrypted key with the real signature, location and time information; (v) support data copy or movement by generating new keys to support both old and new location where disks de-fragment is a similar case; (vi) generate a compound key which contains more specific information about the data location and time information where even if a hacker has the key, the data on unknown location cannot be decrypted; and (vii) when performing decryption, the application signature is generated every time with client information—this information will be sent to the server side via the decryption request, and verified with the client signature saved in server side.

Some embodiments of the present invention may include one, or more, of the following operations, features, characteristics and/or advantages: (i) provides secure encryption and decryption for managed data; (ii) easily tracks data movement, exposure, and leaks; and/or (iii) can be used for data management in a multi-cloud environment.

Some embodiments of the present invention may include one, or more, of the following operations, features, characteristics and/or advantages: (i) handles the case of lost key and data movement; (ii) uses location and time information to compose a new key for verification; (iii) generates an encryption key for secure storage of the data; (iv) the location of the data storage and creation timestamp are wrapped with its key change history (client signature is not in the encryption key); (v) a key index is used to mark which encryption key is in active state; (vi) aims to hold the key by avoiding decrypting/re-encrypting the data in the storage once the key is exposed; (vii) the key is used to protect data in both a transit and static state; (viii) the key's composition mainly is the client's public key, data storage location, data creation timestamp (there is no client information (for example, UUID) included in the key); (ix) handles the case of a key lost and data movement; (x) generates a compound key which contains more specific information about data location and time information; (xi) even if a hacker has the key, the data on the unknown location cannot be decrypted; and/or (xii) includes a unique key design, usage and data process.

Some embodiments of the present invention may include one, or more, of the following operations, features, characteristics and/or advantages: (i) the key is not generated by the attributes that the user sets, but is set by additional information such as client UUID, FQDN, database hardware info, data physical position on hard disk, data creation date, etc.; (ii) the additional information noted above is used to generate a compound key, not encrypt the data directly; (iii) encrypts the common private key with the characteristics of the data and its storage and the client's UUID, FQDN, etc.; and/or (iv) the decryption of data depends on the location/storage of the data.

Some embodiments of the present invention may include one, or more, of the following operations, features, characteristics and/or advantages: (i) provides a way to keep the data more secure even if the key is lost; (ii) the hacker cannot decrypt the data even if he gets the key; (iii) the key used to encrypt the data is not the common key in general; (iv) during the key generation process, it will combine a common key with additional information such as hardware info, data physical position on hard disk, data creation date, etc.; (v) the key will be a composed specialized key for the data in the position on the machine; (vi) the data will be encrypted by the specialized key that belongs to the data specially where they are 1 to 1 match; (vii) during the decryption process, the system will check if the encrypted data location and time match the information in the key, if not, the system will fail to decrypt the data; and/or (viii) if the data is copied to other machines or other directories, the key will not able to decrypt the data because the location and time information do not match.

Some embodiments of the present invention may include one, or more, of the following operations, features, characteristics and/or advantages: (i) the official data copy or movement needs to be supported; (ii) when the data is copied to a new location or machine officially, it will generate a new key; (iii) the new key is a key chain which will contain the old key and the new key with the new data location and time; (iv) sometimes disk de-fragment will change the location of the data, where in this case, it is similar to the process of copying and moving data; (v) the system will generate a new key chain which will contain the old key with the new data location and time; (vi) the specialized key is a composed key which contains more specific information about the data location and time information, etc.; (vii) with this kind of key, the system will recognize the data with a specified location and time; and/or (viii) even if the hacker has the key, the data on the unknown location cannot be decrypted.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use with a data storage system that includes stored data, the CIM comprising:
    receiving a common encryption/decryption (e/d) key;
    combining the common e/d key with additional information to obtain a specialized e/d key, with the additional information including at least one selected from the group consisting of a client signature and a first server signature;
    encrypting a first portion of the stored data with the specialized e/d key so that the specialized e/d key and the first portion of the stored data are a one-on-one match; and
    when copying the first portion of the stored data to a new location, generating a new key chain that contains the specialized e/d key and a new key with a new server signature.

2. The CIM of claim 1 further comprising:
    verifying the specialized e/d key with a real signature, location information and time information.

3. The CIM of claim 1, wherein the copying the stored data to a new location occurs during disk de-fragment.

4. The CIM of claim 1 wherein the first server signature includes data physical position.

5. The CIM of claim 1 wherein the first server signature includes data creation time.

6. The CIM of claim 1 wherein the client information includes UUID (universally unique identifier) and FQDN (fully qualified domain name).

7. A computer program product for use with a data storage system that includes stored data, the CIM computer program product comprising a computer readable storage medium having program instruction stored therein, the program instructions executable by a processor to perform a method comprising:
    receiving a common encryption/decryption (e/d) key;
    combining the common e/d key with additional information to obtain a specialized e/d key, with the additional information including at least one selected from the group consisting of a client signature and a server signature;
    encrypting a first portion of the stored data with the specialized e/d key so that the specialized e/d key and the first portion of the stored data are a one-on-one match; and
    when copying the first portion of the stored data to a new location, generating a new key chain that contains the specialized e/d key and a new key with a new server signature.

8. The computer program product of claim 7, wherein the method further comprises:
    verifying the specialized e/d key with a real signature, location information and time information.

9. The computer program product of claim 7, wherein the copying the stored data to a new location occurs during disk de-fragment.

10. The computer program product of claim 7, wherein the first server signature includes database hardware information and data creation time.

11. The computer program product of claim 7, wherein the first server signature includes data physical position.

12. The computer program product of claim 7, wherein the client information includes UUID (universally unique identifier) and FQDN (fully qualified domain name).

13. A data storage system comprising:
    one or more processors; and
    one or more memories having program instructions executable by the one or more processors to perform a method comprising:
    receiving a common encryption/decryption (e/d) key;
    combining the common e/d key with additional information to obtain a specialized e/d key, with the additional information including at least one selected from the group consisting of a client signature and a server signature;

encrypting a first portion of stored data with the specialized e/d key so that the specialized e/d key and the first portion of the stored data are a one-on-one match; and when copying the first portion of stored data to a new location, generating a new key chain that contains the specialized e/d key and a new key with a new server signature.

14. The system of claim 13, wherein the method further comprises:

verifying the specialized e/d key with a real signature, location information and time information.

15. The system of claim 13, wherein the copying the stored data to a new location occurs during disk de-fragment.

16. The system of claim 13, wherein the client information includes UUID (universally unique identifier) and FQDN (fully qualified domain name).

* * * * *